US010923969B2

(12) United States Patent
Fatemi et al.

(10) Patent No.: US 10,923,969 B2
(45) Date of Patent: Feb. 16, 2021

(54) MOLDED CORE ASSEMBLIES FOR A MOTOR-GENERATOR

(71) Applicant: GM Global Technology Operations LLC, Detroit, MI (US)

(72) Inventors: Alireza Fatemi, Canton, MI (US); Anthony M. Coppola, Rochester Hills, MI (US); Thomas W. Nehl, Shelby Township, MI (US); David J. Brooks, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 16/247,521

(22) Filed: Jan. 14, 2019

(65) Prior Publication Data
US 2020/0227955 A1   Jul. 16, 2020

(51) Int. Cl.
*H02K 1/04* (2006.01)
*H02K 15/12* (2006.01)
*H02K 1/16* (2006.01)
*H02K 1/20* (2006.01)
*H02K 3/12* (2006.01)
*H02K 7/00* (2006.01)
*H02K 15/06* (2006.01)
*B29C 45/14* (2006.01)
*B29K 509/00* (2006.01)
*B29L 31/00* (2006.01)
*B29K 63/00* (2006.01)

(52) U.S. Cl.
CPC ......... *H02K 1/04* (2013.01); *B29C 45/14639* (2013.01); *H02K 1/165* (2013.01); *H02K 1/20* (2013.01); *H02K 3/12* (2013.01); *H02K 7/006* (2013.01); *H02K 15/062* (2013.01); *H02K 15/12* (2013.01); *B29K 2063/00* (2013.01); *B29K 2065/00* (2013.01); *B29K 2509/00* (2013.01); *B29K 2995/0008* (2013.01); *B29L 2031/7498* (2013.01)

(58) Field of Classification Search
CPC ............ H02K 1/04; H02K 1/16; H02K 1/165; H02K 1/20; H02K 3/12; H02K 7/006; H02K 15/062; H02K 15/12; H02K 15/026; H02K 15/028
USPC ................. 310/43, 44, 156.78, 211, 216.067
See application file for complete search history.

(56) References Cited

U.S. PATENT DOCUMENTS

| | | | |
|---|---|---|---|
| 3,848,331 A * | 11/1974 | Pavlik | H02K 1/12 310/43 |
| 5,866,959 A * | 2/1999 | Le Flem | H02K 1/20 310/187 |
| 6,710,498 B1 * | 3/2004 | Lee | H02K 17/165 310/44 |
| 9,925,889 B2 | 3/2018 | Hao et al. | |
| 2010/0040488 A1 * | 2/2010 | Yukitake | H02K 1/02 310/44 |

(Continued)

*Primary Examiner* — Michael Andrews
(74) *Attorney, Agent, or Firm* — Quinn IP Law

(57) ABSTRACT

Systems, methods and motor-generators with preform windings and a molded core are described. The preform windings include a first end, a second end, and a plurality of in-slot portions extending from the first end to the second end. The molded core includes a plurality of slots. Each of the plurality of slots including a respective in-slot portion disposed therein. Each of the plurality of slots includes a wall conforming to an outer profile of the respective in-slot portion.

17 Claims, 4 Drawing Sheets

(56) References Cited

U.S. PATENT DOCUMENTS

2011/0104476 A1* 5/2011 Toyoda .................... H02K 1/02
                                                            428/328
2015/0295459 A1    10/2015 Hao et al.
2017/0063187 A1     3/2017 Hao et al.

* cited by examiner

MOLDED CORE ASSEMBLIES FOR A MOTOR-GENERATOR

The disclosure relates to the field of electric machines and, more specifically, to systems, methods, and devices including at least one molded core.

Rotary electric machines, such as motor-generator units, include a stator circumscribing a rotor body. Fabricating stators generally includes stacking laminated electrical steels and inserting stator windings into slots within the stator. Accordingly, manufacturing tolerances as well as other machining and design considerations are introduced to allow for the insertion of the stator windings.

What is more, additional processes may be required to complete the windings after insertion. For example, end windings may have to be welded or otherwise connected to form the winding circuit. This further increases manufacturing considerations by constraining tooling design and increases overall size of the resulting rotary electric machine.

SUMMARY

Assemblies with a molded core as described herein optimize properties of motor-generator units. Beneficially, the assemblies as described may be used to optimize the noise, vehicle, and harshness associated with the motor-generator, optimizes options of windings incorporated in the motor-generator, provides for in situ winding cooling, provides for reduced overall size of the motor-generator, and reduced part count for the motor-generator.

According to aspects of the present disclosure, an assembly for a motor-generator includes preform windings and a molded core. The preform windings include a first end, a second end, and a plurality of in-slot portions extending from the first end to the second end. The molded core includes a plurality of slots. Each of the plurality of slots includes a respective in-slot portion of the plurality of in-slot portions disposed therein. Each of the plurality of slots includes a wall conforming to an outer profile of the respective in-slot portion.

According to further aspects of the present disclosure, the molded core is formed from a curable material including a resin and a ferromagnetic filler.

According to further aspects of the present disclosure, the ferromagnetic filler is ferrosilicon.

According to further aspects of the present disclosure, the molded core is a molded stator core, the assembly further includes at least one of a housing or a portion of a stator-mounting assembly, and the at least one of the housing or the portion of the stator-mounting assembly is a portion of a mold used to form the molded stator core.

According to further aspects of the present disclosure, the at least one of the housing or the portion of the stator-mounting assembly is attached to the molded stator core using a mechanical interlock.

According to further aspects of the present disclosure, the assembly further includes a plurality of stator teeth. Each of the plurality of stator teeth is disposed between a respective pair of stator slots from the plurality of slots. The stator teeth include cooling conduits therethrough.

According to further aspects of the present disclosure, the in-slot portions include a first group of in-slot portions and a second group of in-slot portions. The first group of in-slot portions includes a first number of conductors and the second group of in-slot portions includes a second number of the conductors.

According to aspects of the present disclosure, a method includes obtaining preform windings, placing the preform windings into a mold, injecting a curable material into the mold, and hardening the curable material to thereby produce the molded stator core about the preform windings. The preform windings include a first end, a second end, and a plurality of in-slot portions extending from the first end to the second end. The mold includes a first surface corresponding to at least a portion of an outer periphery of a molded stator core and a second surface corresponding to at least a portion of an interior periphery of the molded stator core. The curable material includes a resin and a ferromagnetic filler.

According to further aspects of the present disclosure, the ferromagnetic filler is ferrosilicon.

According to further aspects of the present disclosure, the mold includes a first mold portion and a second mold portion, wherein the first mold portion is at least one of a housing or a portion of a stator-mounting assembly, and wherein the method further includes removing the second mold portion to thereby produce a stator assembly.

According to further aspects of the present disclosure, the at least one of the housing or the portion of the stator-mounting assembly is attached to the molded stator core using a mechanical interlock.

According to further aspects of the present disclosure, the method further includes disposing, prior to hardening the curable material, a cooling-conduit precursor within the mold.

According to further aspects of the present disclosure, the cooling-conduit precursor is a sacrificial material. The method further includes removing, after hardening the curable material, the sacrificial material such that the molded stator core defines a cooling conduit therein.

According to further aspects of the present disclosure, the cooling-conduit precursor is a pipe including a first portion defining a first longitude and a second portion defining a second longitude. The first portion is non-parallel to the second portion, and the pipe is continuous between the first portion and the second portion.

According to aspects of the present disclosure, a vehicle includes an electrical power source and a motor-generator operatively coupled to the electrical power source. The motor-generator includes a stator assembly with preform windings and a molded stator core. The preform windings include a first end, a second end, and a plurality of in-slot portions extending from the first end to the second end. The molded stator core includes a plurality of stator slots. Each of the plurality of stator slots includes a respective in-slot portion of the plurality of in-slot portions disposed therein. Each of the plurality of stator slots includes a wall conforming to an outer profile of the respective in-slot portion According to further aspects of the present disclosure, the molded stator core is formed from a curable material including a resin and a ferromagnetic filler.

According to further aspects of the present disclosure, the ferromagnetic filler is ferrosilicon.

According to further aspects of the present disclosure, the stator assembly further includes at least one of a housing or a portion of a stator-mounting assembly. The at least one of the housing or the portion of the stator-mounting assembly are a portion of a mold used to form the molded stator core.

According to further aspects of the present disclosure, the at least one of the housing or the portion of the stator-mounting assembly is attached to the molded stator core using a mechanical interlock.

According to further aspects of the present disclosure, the molded stator core further includes a plurality of stator teeth. Each of the plurality of stator teeth is disposed between a respective pair of stator slots from the plurality of stator slots, and the stator teeth include cooling conduits therethrough.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
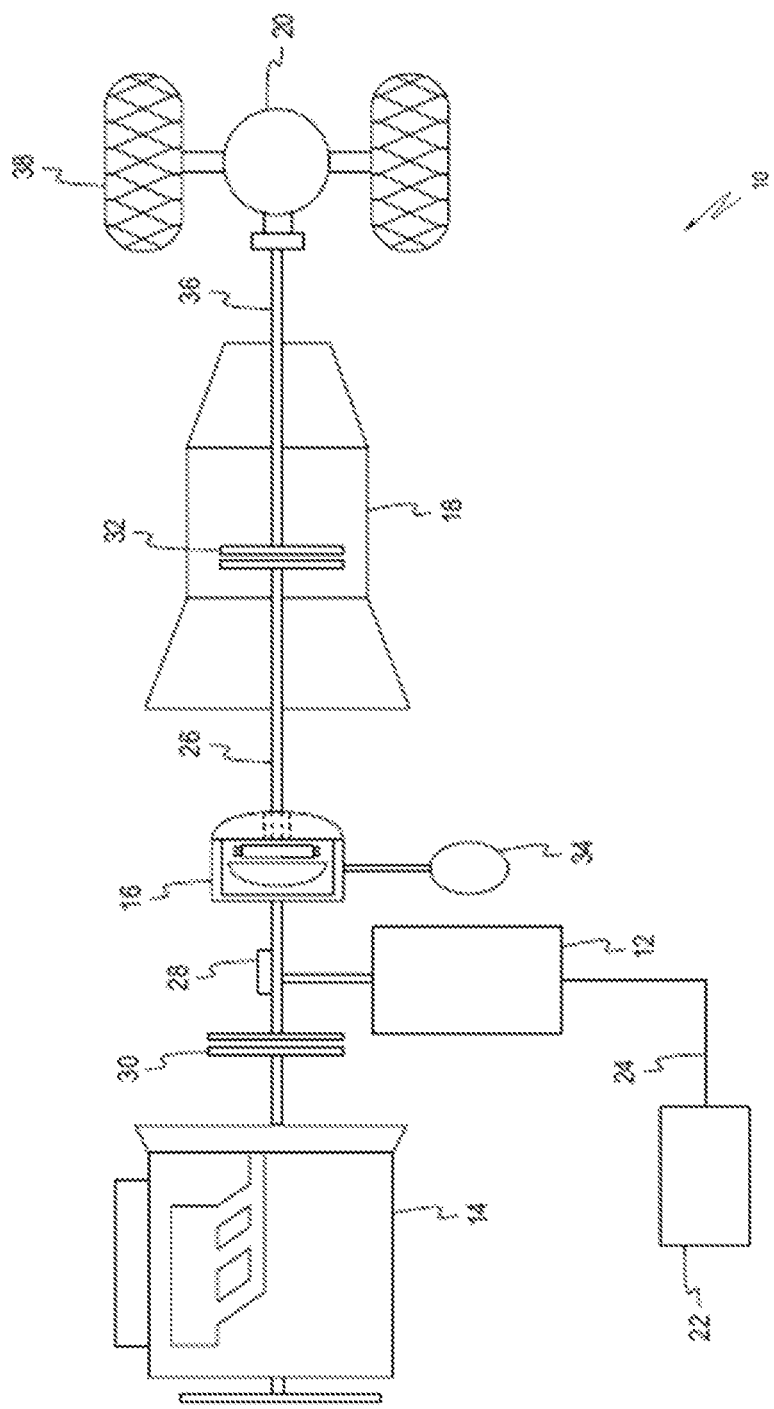
FIG. 1 is a schematic illustration of a representative vehicle with stator and rotor assemblies in accordance with aspects of the present disclosure.

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

FIG. 1 is a schematic illustration of a vehicle 10 including a motor-generator 12, which is configured to propel the vehicle 10 alone and/or in concert with another power source, such as an engine 14. The vehicle 10 may be, for example, a hybrid electric vehicle, plug-in hybrid electric vehicle, range-extended hybrid electric vehicle, fuel-cell electric vehicle, fuel cell hybrid electric vehicle, or the like. The illustrated vehicle 10 includes a hybrid powertrain with the motor-generator 12, the engine 14, a torque converter 16, a transmission 18, and a final drive 20. The hybrid powertrain may be, for example, parallel (e.g., P1-P4) hybrid powertrains, a power-split ("PS") hybrid powertrain, or the like.

The motor-generator 12 is configured to convert between electrical power and mechanical power. The motor-generator 12 may be selectively actuated to propel the vehicle 10 or charge an electrical power source. The motor-generator 12 is operatively coupled to the electrical power source, such as battery pack 22, via conductors 24 configured to transmit electrical energy therebetween.

The motor-generator 12 is also operatively coupled to a transmission input 26 via a motor output 28 configured to transmit mechanical energy therebetween. As will be explained further below with reference to FIG. 2, the motor-generator 12 includes a rotor body 202 and a stator assembly 204 within a motor body. In some aspects, the vehicle 10 has a single motor-generator 12, while in other aspects, the vehicle 10 has a plurality of motor-generators 12.

The engine 14 is configured to burn a fuel to produce mechanical power. The engine 14 may be a suitable internal combustion engine, such as a two or four-stroke compression-ignited diesel engine or a four-stroke spark-ignited gasoline or flex-fuel engine, which is readily adapted to provide its available power output typically at a number of revolutions per minute (RPM). In some aspects, the vehicle 10 has a single engine 14, while in other aspects, the vehicle 10 includes a plurality of engines 14.

In the illustrated example, the engine 14 is coupled to an engine-disconnect clutch 30. The engine-disconnect clutch 30 is configured to be selectively actuated to thereby transmit torque received from the engine 14 to an input structure of the torque converter 16.

The torque converter 16 is configured to optimize delivered torque based on differences in revolutions per minute (RPM) of the input and output. For example, the torque converter 16 may be a hydrokinetic device configured to increase torque that is received from, for example, the engine 14 or motor-generator 12 via, for example, when the output is at a lower RPM. Additionally or alternatively, the torque converter 16 may include a selectively actuatable mechanical device, such as a lock-up clutch, to form a mechanical coupling between the input and output of the torque converter 16.

The transmission 18 is configured to receive power from powerplants, such as the motor-generator 12 and/or engine 14, selectively manipulate the received power, such as through a selecting one of a plurality of gear ratios, and distributing the manipulated power to the final drive 20. The transmission 18 may be, for example, an automatic transmission, manual transmission, continuously variable transmission, combinations thereof, and the like.

The power transmission 18 may use differential gearing 32 to achieve selectively variable torque and speed ratios between the transmission input 26 and the driveshaft 36. For example, the differential gearing 32 may be an epicyclic planetary gear arrangement.

Hydraulically actuated torque establishing devices, such as clutches and brakes (referred to collectively and/or individually as a "clutch"), are selectively engageable via a hydraulic pump 34 to activate the aforementioned differential gearing to achieve desired forward and reverse speed ratios between the transmission input 26 and driveshaft 36 of the transmission 18.

The final drive 20 is configured to deliver torque to one or more wheels 38 of the vehicle. In some aspects, the final drive 20 is directly coupled to the transmission 18 via the driveshaft 36 such that power from the motor-generator 12 and/or engine 14 may be transmitted to one or more of the wheels 38 via the transmission 18. The final drive 20 may be, for example, a differential. The final drive 20 may take on numerous configurations, including front wheel drive, rear wheel drive, four-wheel drive, all-wheel drive, etc.

One or more of the illustrated powertrain components may be actuated or operated by an onboard or remote vehicle controller, such as programmable electronic control unit constructed and programmed to govern, among other things, operation of the engine 14, motor-generator 12, transmission 18, torque converter 16, clutches, combinations thereof, and the like. Control module, module, controller, control unit, processor, and permutations thereof may be defined to mean one or various combinations of one or more of logic circuits, application specific integrated circuit(s) (ASIC), electronic circuit(s), central processing unit(s) (e.g., microprocessor(s)), and associated memory and storage (e.g., read only, programmable read only, random access, hard drive, tangible, etc.)), combinational logic circuit(s), input/output circuit(s) and devices, etc., whether resident, remote, or a combination of both. The foregoing hardware may be configured to execute one or more software or firmware programs or routines, e.g., using appropriate signal conditioning and buffer circuitry, and other components to provide the described functionality. Software, firmware, programs, instructions, routines, code, algorithms and similar terms may be defined to mean controller-executable instruction sets, including calibrations and look-up tables. An electronic control unit may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals during ongoing vehicle use. Alternatively, routines may be executed in response to occurrence of an event during operation of the vehicle 10.

Figure 2:
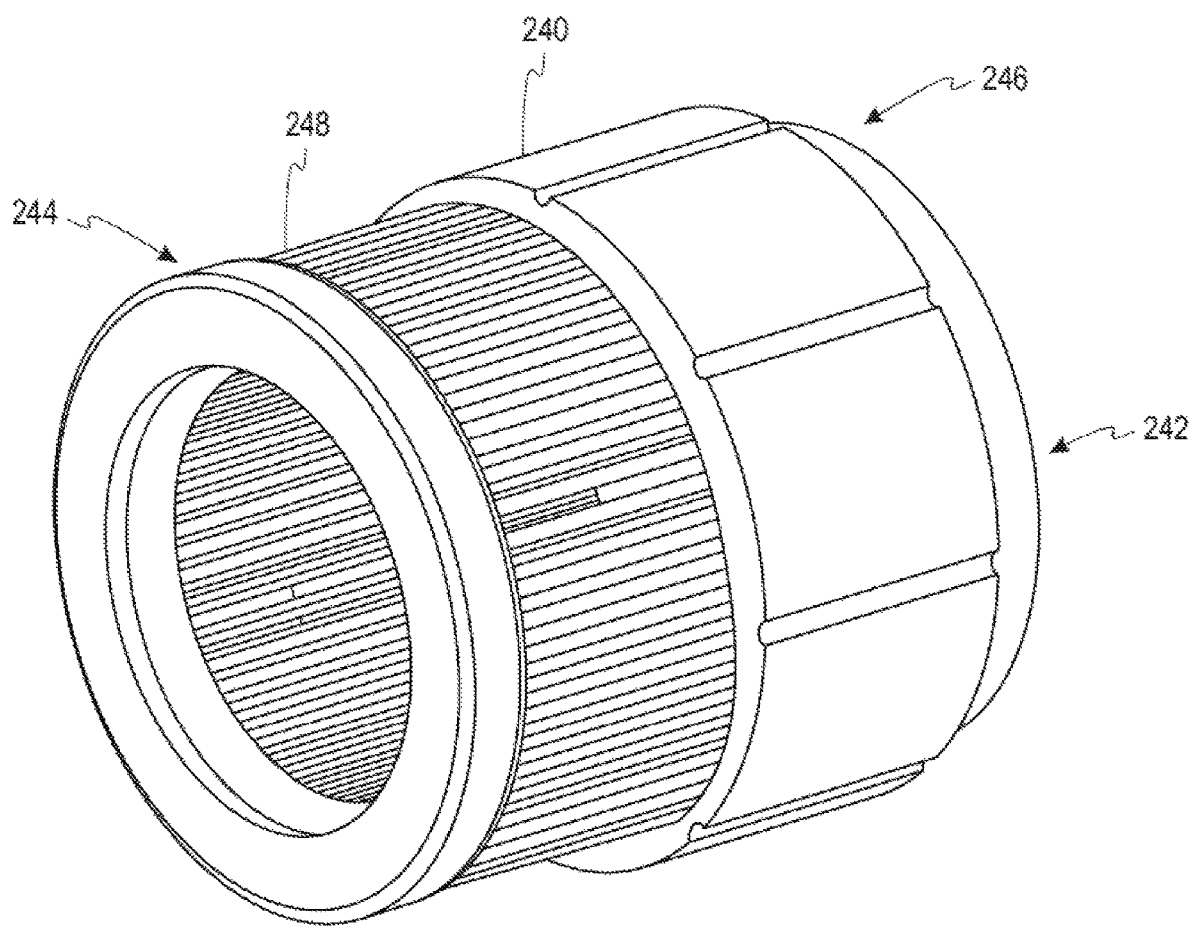
FIG. 2 is a schematic partial cross-sectional illustration of a stator assembly in accordance with aspects of the present disclosure.
Figure 3:
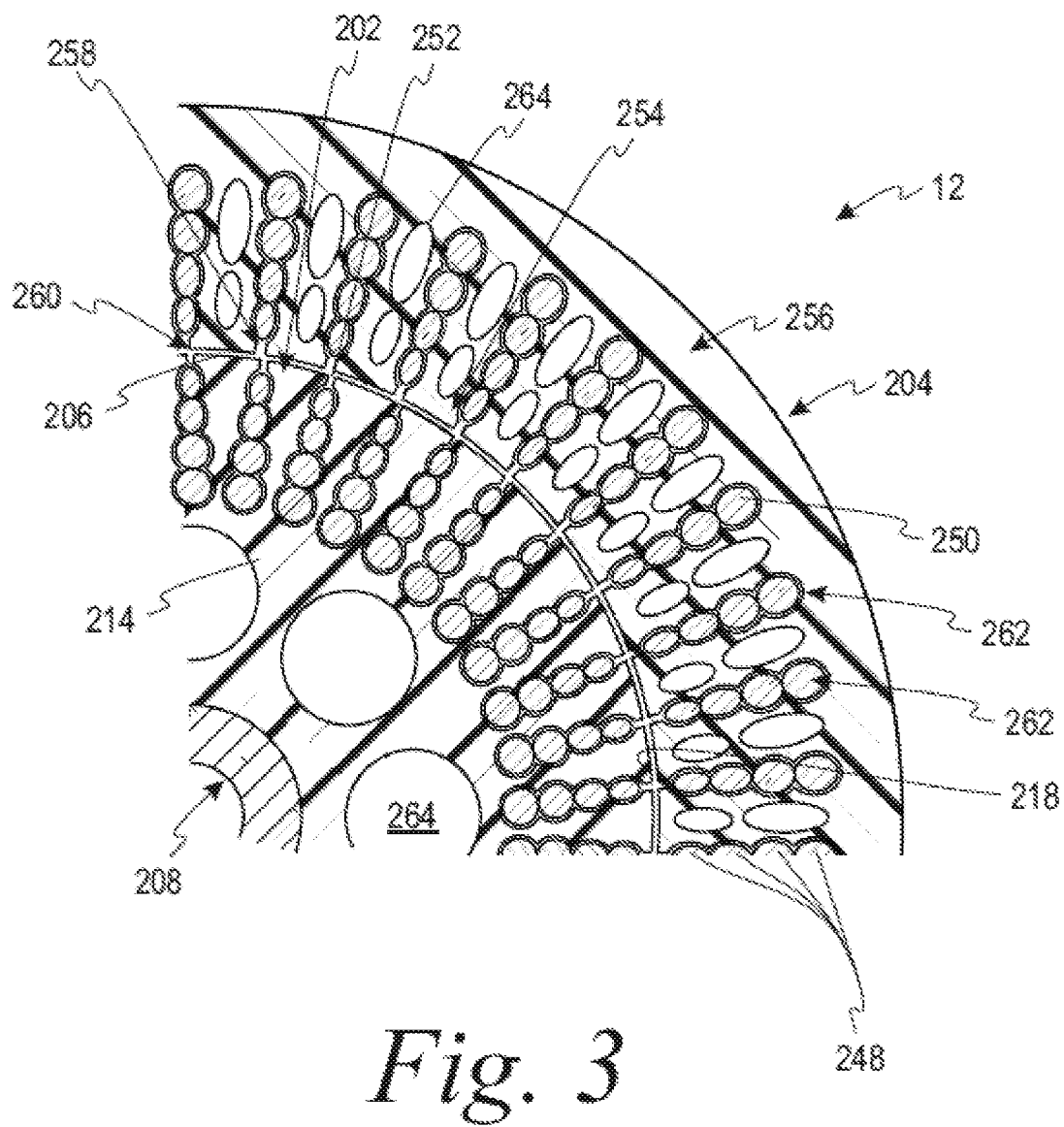
FIG. 3 is a schematic partial cross-sectional illustration of a representative electric machine with the molded stator core of FIG. 2.

Referring now to FIGS. 2 and 3, portions of the motor-generator 12 are shown. The motor-generator 12 includes the rotor body 202 circumscribed by and concentric with the stator assembly 204. Electric power is provided to the stator assembly 204 via electrical conductors 24 that pass through the motor body in suitable sealing and insulating feed-throughs (not illustrated) to thereby produce rotational motion of the rotor body 202. Conversely, mechanical power may be provided to the rotor body 202 to induce a current in the stator assembly 204 and thereby provide electrical energy to the electrical power source, e.g., via regenerative breaking.

The rotor body 202, for example a squirrel cage rotor, is disposed about the motor-generator shaft 208 and may be splined, attached, fused, or otherwise rotationally fixed thereto. The rotor body 202 generally defines a truncated right circular cylinder. The rotor body 202 includes a molded rotor core 214. The molded rotor core 214 is formed-in-place about preform windings 242. As used herein, formed in place is used to indicate that portions of the preform windings 242 within slots of the molded rotor core 214 are structured and positioned prior to formation of the molded rotor core 214 therearound. Beneficially, the molded rotor core 214 may be used to optimize efficiency of the motor-generator 12, for example, by reducing movement windings when reacting to an induced current. Additionally or alternatively, the preform windings 242 and the molded rotor core 214 reduce or remove potential drawbacks or defects from inserting windings into predefined rotor slots or pre-wound rotor segments. The preform windings 242 are circumferentially arranged about the motor-generator shaft 208 between the motor-generator shaft 208 and a peripheral edge 218 of the rotor body 202.

The stator assembly 204 is coaxial with and surrounds the rotor body 202 while maintaining a small space 206 therebetween. In some aspects, the space 206 is between about 0.2 mm and about 1.0 mm. Beneficially, the stator assembly 204 described herein provides for additional degrees of freedom in magnetic, thermal, and mechanical design of the motor-generator 12 as compared to, for example, laminated magnetic steels.

The stator assembly 204 is generally annular along a longitudinal axis of the rotor body 202, and includes a molded stator core 240 that is formed-in-place about preform windings 242 (e.g., FIG. 3). As used herein, formed in place is used to indicate that portions of the preform windings 242 within the molded stator core 240 are structured and positioned prior to formation of the molded stator core 240 therearound. Beneficially, the molded stator core 240 may be used to optimize the noise, vibration, and harshness of the motor-generator 12, for example, by reducing movement or vibration of the windings. Additionally or alternatively, preform windings 242 and the molded stator core 240 reduce or remove potential drawbacks or defects from inserting windings into predefined stator slots.

The preform windings 242 are configured to receive electrical energy from an electrical power source to thereby generate a magnetic field that produces rotation of the rotor body 202 and/or configured to supply electrical energy to the electrical power source from a current induced by rotation of the rotor body 202. The preform windings 242 include a first end 244, a second end 246, and a plurality of in-slot portions 248 therebetween. A plurality of conductors 250 traverse the first end 244, the second end 246, and the plurality of in-slot portions 248 of the preform windings 242 to transmit the electrical energy therethrough. The conductors 250 may be formed from a suitable electrically conductive material such as copper or aluminum and may be stranded, formed, hairpin, bar-wound, combinations thereof, and the like.

The in-slot portions 248 may include a desired number of conductive layers, paths, strands, materials, combinations thereof, and the like. Each of the in-slot portions 248 passes through a respective stator slot 252 of the stator assembly 204. Advantageously, the molded stator core 240 as described herein allows for a first of the in-slot portions 248 to include a first number of layers, paths, or strands while a second of the in-slot portions 248 includes a second number of the layers, paths, or strands while still providing the benefits described herein.

Beneficially, use of preform windings 242 allows for more-efficient winding by eliminating or reducing certain clearance restrictions. For example, tooling to form the windings may take advantage of all space between adjacent in-slot portions 248.

The molded stator core 240 is configured to provide structural support to the preform windings 242 during operation of the motor-generator 12 and may be further configured to optimize the electromagnetic field produced by the preform windings 242. The molded stator core 240 may be formed, for example, using overmolding techniques. The molded stator core 240 includes a plurality of stator teeth 254 and a plurality of stator yokes 256.

The stator yokes 256 are disposed proximate an outer periphery of the molded stator core 240. Each stator yoke 256 extends between adjacent pair of stator teeth 254 such the stator yoke 256 and the respective pair of stator teeth 254 cooperatively define a stator slot 252. The stator teeth 254 and the stator yoke 256 may be sized and shaped to provide desired electromagnetic properties of the molded stator core 240.

The stator teeth 254 aid in reducing or eliminating torque ripple and/or AC conductor losses. Each of the plurality of stator teeth 254 extends radially toward the center of the motor-generator 12. As seen in FIG. 2, each stator tooth 254 includes a lip 258 at an end proximate the center of the motor-generator 12. Beneficially, the lips 258 of the molded stator core 240 may be configured to provide structural support to the preform windings 242 by directly contacting the preform windings 242 (e.g., contacting the in-slot portions 248 without a wedge or resilient member therebetween).

A gap 260 exists between lips 258 of adjacent stator teeth 254. Beneficially, the gap 260 may be sized and shaped without consideration of sizing of the conductors 250 or the in-slot portions 248 to provide desired properties of the magnetic field. In some aspects, the gap 260 is occupied by at least one of the conductors 250. Beneficially, such a configuration reduces a distance between the in-slot portions 248 and the rotor body 202. In some aspects, the gap 260 is smaller than one of the conductors 250. Beneficially, the gap 260 being smaller than one of the conductors 250 may be used to provide optimized magnetic properties such as magnetic flux. In some aspects, no gap exists such that adjacent stator teeth are connected at the end proximate the center of the motor generator. Beneficially, absence of a gap may be used to optimize magnetic properties or provide structural support.

In some aspects, the molded stator core 240 is formed from a curable material having a flowable state and a hardened state. In some aspects, the curable material includes a resin with a ferromagnetic filler dispersed therethrough. The resin may be, for example, a phenolic or epoxy resin.

In some aspects, the resin is selected to have a low curing temperature while having a low viscosity and high thermal resilience. As used herein, "low curing temperature" means a temperature that is sufficiently low to inhibit or prevent short circuiting between individual conductors 250 within the in-slot portions 248. For example, the curing temperature may be selected to inhibit damage to an insulating coating of the in-slot portions 248. Further, as used herein, "low viscosity" means a viscosity that allows the resin to be formed into the desired shape about the preform in-slot portions 248 at process temperature (e.g., sufficiently low to allow for the resin to be injection molded about the preform in-slot portions 248). For example, the resin may have a flow length of between 100 and 110 cm when measured using ASTM D3123. Also, as used herein, "high thermal resilience" means a thermal resilience sufficient to inhibit or prevent deformation or degradation of the resin matrix at operational temperatures. For example, the thermal resilience may be above 150° C. before experiencing deformation, above 180° C. before experiencing deformation, or above 220° C. before experiencing deformation.

The ferromagnetic filler is incorporated into the resin to provide a homogenous distribution and optimize wettability of surfaces by the resin. For example, the ferromagnetic filler may include coatings and/or surface treatments to optimize interaction between the ferromagnetic filler and the resin. The ferromagnetic filler is selected to provide a desired flux density within the molded stator core 240. In some aspects, the ferromagnetic filler has close-packed structure, such as greater than 66% occupied space. In some aspects, the ferromagnetic filler has greater than about 74% occupied space. For example, the ferromagnetic filler may have a face-centered cubic structure, a cubic closest packed structure, a hexagonal closest packed structure, or combinations thereof.

In some aspects, the ferromagnetic filler is a binary alloy. As is recognized by one of ordinary skill in the art, as used herein, the term "binary alloy" is used to indicate that the alloy is substantially composed of two selected elements, but may also include an amount of contaminants, such as trace amounts of similar elements that are impracticable to further remove. In some aspects, the ferromagnetic filler is a binary alloy including iron and silicon. For example, the ferromagnetic filler may be ferrosilicon (FeSi).

The stator slots 252 are circumferentially spaced about the molded stator core 240. Each of the stator slots 252 generally surrounds a respective one of the in-slot portions 248. As seen in FIG. 2, each of the stator slots 252 includes walls 262 in contact with the respective in-slot portions 248. Prior to curing, the curable material is in the flowable state such that the resin and ferromagnetic filler conform to the outer profile of the respective in-slot portion 248. After curing, the curable material is in the hardened state such that the walls 262 of the stator slots 252 are defined by the outer profile of the respective in-slot portion 248.

Beneficially, the outer profile of the in-slot portions 248 defining the walls 262 of the respective stator slot 252 provides structural reinforcement to the preform windings 242 (e.g., inhibiting rotation of the in-slot portions 248 about an axis thereof). Such reinforcement optimizes longevity of the preform windings 242 and/or optimizes control and temporal continuity of the magnetic field within the motor-generator 12.

Beneficially, direct contact between the preform windings 242 and the molded stator core 240 optimizes dissipation of heat from the in-slot portions 248 through thermal conduction. Further, conformation of the resin and ferromagnetic filler to the outer profile of the respective in-slot portions 248 provides for a higher conductor-fill factor than is achievable using non-molded stator cores.

In some aspects, the molded stator core 240 further includes cooling conduits disposed therein. The cooling conduits 264 are configured to have a cooling fluid therein to dissipate heat from the molded stator core 240 and the preform windings 242. The cooling conduits 264 may be configured to actively cool, such as via a coolant loop including a pump to flow the coolant therethrough, or passively cool, such as via heat pipes. The cooling fluid may be, for example, polar or nonpolar fluids such as water or oil.

The cooling conduits 264 may be formed via permanent tooling or sacrificial tooling. For example, piping or a sacrificial material may be placed relative to the preform windings 242 prior to formation of the molded stator core 240. Beneficially, the cooling conduits 264 may form paths that are not physically possible to be formed within laminated stators (e.g., paths having angled portions or paths defined by the stator material).

Beneficially, the cooling conduits 264 may be disposed within the stator teeth 254 to optimize heat transfer. Additionally or alternatively, the cooling conduits 264 may be configured to also cool the end-windings. Beneficially, cooling conduits 264 for cooling both the end-windings and the in-slot portions 248 may be unitary (e.g., not requiring fittings or seals between parts of the cooling conduit 264 corresponding to the end portions and parts of the cooling conduit 264 corresponding to the in-slot portions), thus optimizing longevity of the stator assembly 204.

Figure 4:
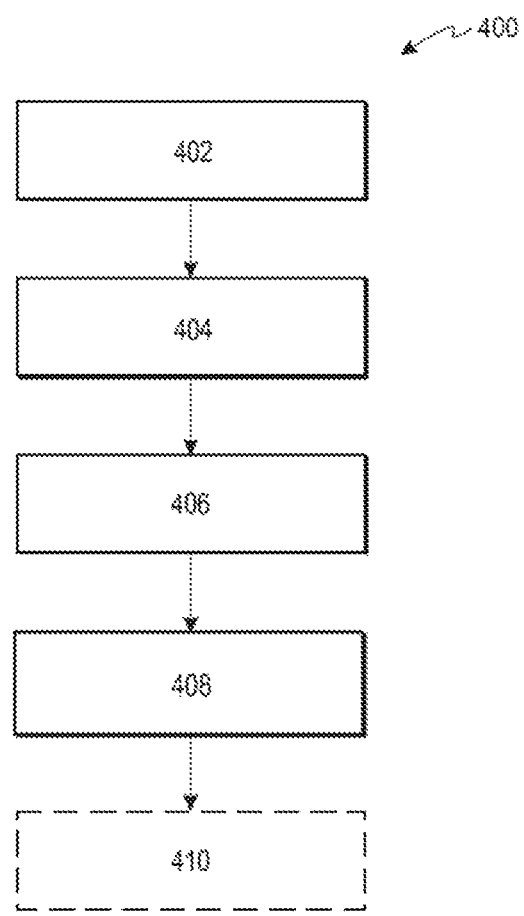
FIG. 4 is a method of making stator and rotor assemblies in accordance with aspects of the present disclosure.

Referring now to FIG. 4, a method 400 of forming the motor-generator 12 is shown. The method 400 includes obtaining 402 the preform windings 242, placing 404 the preform windings 242 into a mold, injecting 406 the curable material into the mold, hardening 408 the curable material to thereby produce the molded stator core 240 about the preform windings 242.

The mold includes a first surface corresponding to at least a portion of an outer periphery of the molded stator core 240 and a second surface corresponding to at least a portion of an interior periphery of the molded stator core 240. In some aspects, the second surface includes first features corresponding to the stator lips 258 and/or second features corresponding to the gaps 260 between adjacent stator teeth 254.

The curable material is injected into the mold such that the resin and the ferromagnetic filler conform to the first surface of the mold, the second surface of the mold, and each exposed periphery of at least a respective one of the in-slot portions 248. Additionally or alternatively, the method 400 may be used to form the rotor body 202 in a similar manner.

In some aspects, the method 400 further includes removing 410, after hardening 408, the mold from the molded stator core 240 and the preform windings 242 to thereby produce the stator assembly 204. In some aspects, a first portion of the mold remains in-place as at least one of a housing or a portion of a stator-mounting assembly such that the method 400 further includes removing 410, after hardening 408, a second portion of the mold to thereby produce the stator assembly 204. In some aspects, the first portion of the mold further includes protrusions on the first surface such that the protrusions form mechanical interlocks with the molded stator core 240. As used herein, "mechanical interlocks" are used to indicate that the mechanical interlock fixes two components relative to each other in three dimensions during operation of the motor-generator.

Beneficially, cross-sectional profiles of the molded rotor core 214 and/or the molded stator core 240 as well as ferromagnetic filler loading within the resin matrix may be adjusted to provide and tune properties of the rotor body 202 and stator assembly 204, such as permeability, core losses, and saturation flux. What is more, the preform windings 242 may be formed without welds. Such formation reduces manufacturing processes and costs as well as reduces electrical losses arising from the weld material and interfaces between the weld and the conductors.

Beneficially, the molded cores reduce waste material by eliminating the need for stamping and trimming laminations from sheet material. Further, the molded cores reduce tooling required to form the rotor and/or stator by providing for formation of the molded rotor core 214 and the molded stator core 240 without assembling laminations.

Beneficially, the motor-generator 12 described herein is agnostic as to winding type (concentrated windings and/or distributed windings) and as to slot-pole combinations. Beneficially, components of the stator assembly 204, such as the stator housing or stator mounting assembly, may be embedded into the structure of the molded stator core 240. Such embedding and integration optimize production of the stator assembly 204.

As is appreciated by one of ordinary skill in the art, the molded rotor core 214 and/or the molded stator core 240 is applicable to different types of radial flux machines, such as, for example, synchronous or induction motor-generators.

While the above-described embodiments have been described with respect to an induction motor, a person of skill in the art will recognize that the above-described concepts are applicable to other types of motor-generator, such as reluctance or permanent-magnet motor-generators.

While the above-described embodiments have been described with respect to an inner-rotor configuration, it is contemplated that the motor-generator 12 may be an outer-rotor configuration without departing from features and advantages of the present disclosure.

While the best modes for carrying out the disclosure have been described in detail, those familiar with the art to which this disclosure relates will recognize various alternative designs and embodiments for practicing the disclosure within the scope of the appended claims.

What is claimed is:

1. An assembly for a motor-generator, the assembly comprising:
    preform windings including a first end, a second end, and a plurality of in-slot portions, the plurality of in-slot portions extending from the first end to the second end; and
    a molded core including a plurality of slots, each of the plurality of slots including a respective in-slot portion of the plurality of in-slot portions disposed therein, each of the plurality of slots including a wall conforming to an outer profile of the respective in-slot portion;
    wherein the molded core is a molded stator core, the assembly further comprises at least one of a housing or a portion of a stator-mounting assembly, the at least one of the housing or the portion of the stator-mounting assembly is a portion of a mold used to form the molded stator core.

2. The assembly of claim 1, wherein the molded core is formed from a curable material including a resin and a ferromagnetic filler.

3. The assembly of claim 2, wherein the ferromagnetic filler is ferrosilicon.

4. The assembly of claim 1, wherein the at least one of the housing or the portion of the stator-mounting assembly is attached to the molded stator core using a mechanical interlock.

5. The assembly of claim 1, further comprising a plurality of stator teeth, each of the plurality of stator teeth being disposed between a respective pair of slots from the plurality of slots, the stator teeth including cooling conduits therethrough.

6. The assembly of claim 1, wherein the in-slot portions include a first group of in-slot portions and a second group of in-slot portions, and wherein the first group of in-slot portions includes a first number of conductors and the second group of in-slot portions includes a second number of the conductors.

7. A method comprising:
    obtaining preform windings including a first end, a second end, and a plurality of in-slot portions extending from the first end to the second end;
    placing the preform windings into a mold, the mold including a first surface corresponding to at least a portion of an outer periphery of a molded core and a second surface corresponding to at least a portion of an interior periphery of the molded core;
    injecting a curable material into the mold, the curable material including a resin and a ferromagnetic filler; and
    hardening the curable material to thereby produce the molded core about the preform windings;
    wherein the mold includes a first mold portion and a second mold portion, wherein the first mold portion is at least one of a housing or a portion of a stator-mounting assembly, and wherein the method further includes removing the second mold portion to thereby produce a stator assembly.

8. The method of claim 7, wherein the ferromagnetic filler is ferrosilicon.

9. The method of claim 7, wherein the at least one of the housing or the portion of the stator-mounting assembly is attached to the molded stator core using a mechanical interlock.

10. The method of claim 7, further comprising disposing, prior to hardening the curable material, a cooling-conduit precursor within the mold.

11. The method of claim 10, wherein the cooling-conduit precursor is a sacrificial material, and wherein the method further comprises removing, after hardening the curable material, the sacrificial material such that the molded core defines a cooling conduit therein.

12. The method of claim 10, wherein the cooling-conduit precursor is a pipe including a first portion defining a first longitude and a second portion defining a second longitude, wherein the first portion is non-parallel to the second portion, and wherein the pipe is continuous between the first portion and the second portion.

13. A vehicle comprising:
an electrical power source;
a motor-generator operatively coupled to the electrical power source, the motor-generator including:
preform windings including a first end, a second end, and a plurality of in-slot portions, the plurality of in-slot portions extending from the first end to the second end; and
a molded core including a plurality of slots, each of the plurality of slots including a respective in-slot portion of the plurality of in-slot portions disposed therein, each of the plurality of slots including a wall conforming to an outer profile of the respective in-slot portion;
wherein the molded core is a molded stator core, the motor-generator further comprises at least one of a housing or a portion of a stator-mounting assembly, and wherein the at least one of the housing or the portion of the stator-mounting assembly being a portion of a mold used to form the molded stator core.

14. The vehicle of claim 13, wherein the molded stator core is formed from a curable material including a resin and a ferromagnetic filler.

15. The vehicle of claim 14, wherein the ferromagnetic filler is ferrosilicon.

16. The vehicle of claim 13, wherein the at least one of the housing or the portion of the stator-mounting assembly is attached to the molded stator core using a mechanical interlock.

17. The vehicle of claim 13, further comprising a plurality of stator teeth, each of the plurality of stator teeth being disposed between a respective pair of slots from the plurality of slots, the stator teeth including cooling conduits therethrough.

* * * * *